United States Patent
Ryan

(10) Patent No.: US 11,550,566 B2
(45) Date of Patent: Jan. 10, 2023

(54) AUTOMATICALLY INTEGRATING SOFTWARE COMPONENTS INTO A CONTROL FRAMEWORK IN A DISTRIBUTED COMPUTING ENVIRONMENT

(71) Applicant: Red Hat, Inc., Raleigh, NC (US)

(72) Inventor: Michael Gerard Ryan, Waterford (IE)

(73) Assignee: RED HAT, INC., Raleigh, NC (US)

( * ) Notice: Subject to any disclaimer, the term of this patent is extended or adjusted under 35 U.S.C. 154(b) by 31 days.

(21) Appl. No.: 17/171,236

(22) Filed: Feb. 9, 2021

(65) Prior Publication Data
US 2022/0253306 A1    Aug. 11, 2022

(51) Int. Cl.
G06F 9/44    (2018.01)
G06F 8/70    (2018.01)
H04L 67/10   (2022.01)
G06F 8/61    (2018.01)

(52) U.S. Cl.
CPC .......... G06F 8/70 (2013.01); G06F 8/62 (2013.01); H04L 67/10 (2013.01)

(58) Field of Classification Search
None
See application file for complete search history.

(56) References Cited

U.S. PATENT DOCUMENTS

| 8,527,943 | B1 * | 9/2013 | Chiluvuri | G06F 8/36 |
| | | | | 717/107 |
| 2013/0226638 | A1 * | 8/2013 | Colvard | G06Q 10/06 |
| | | | | 705/7.14 |
| 2019/0081907 | A1 * | 3/2019 | Gopalakrishnan | |
| | | | | H04L 41/0823 |
| 2020/0348984 | A1 * | 11/2020 | Giannetti | G06F 9/5072 |
| 2020/0401452 | A1 * | 12/2020 | Piercey | G06F 9/45558 |
| 2021/0311758 | A1 * | 10/2021 | Cao | G06F 9/5027 |

FOREIGN PATENT DOCUMENTS

| CN | 111352717 A | 6/2020 |
| CN | 112000441 A | 11/2020 |

OTHER PUBLICATIONS

Ahmed, M., "Creating Custom Kubernetes Operators," Magalix Corporation, Dec. 9, 2019, https://www.magalix.com/blog/creating-custom-kubernetes-operators.

(Continued)

*Primary Examiner* — Wei Y Zhen
*Assistant Examiner* — Lanny N Ung
(74) *Attorney, Agent, or Firm* — Kilpatrick Townsend & Stockton LLP

(57) ABSTRACT

Software components can be automatically integrated into a control framework in a distributed computing environment. For example, a system can determine that a flag is set in relation to a complementary resource that is monitored by a controller in a distributed computing environment. In response to determining that the flag is set, the system can identify a target software component that is not managed by the controller in the distributed computing environment. The system can then integrate the target software component into a control framework of the distributed computing environment in which the target software component is managed by the controller based on the complementary resource.

20 Claims, 4 Drawing Sheets

---

402
Determine that a flag is set in relation to a complementary resource that is monitored by a controller in a distributed computing environment

404
In response to determining that the flag is set, identify a target software component that is not managed by the controller in the distributed computing environment

406
Integrate the target software component into a control framework of the distributed computing environment in which the target software component is managed by the controller based on the complementary resource

(56) References Cited

OTHER PUBLICATIONS

Rasuski, S., "How to Create a Custom Resource with Kubernetes Operator," Software Engineer at CodiLime, Nov. 12, 2020, https://codilime.com/how-to-create-a-custom-resource-with-kubernetes-operator/.

"Custom Resources," VMware, Inc., Apr. 24, 2020, https://docs.vmware.com/en/VMware-NSX-T-Data-Center/3.0/ncp-Kubernetes/GUID-BF2BAD10-B244-40BA-A5D7-83C4C6432AD1.html.

"Deploy Kubernetes Custom Resources using CRDs," Downloaded from Internet on Feb. 8, 2021, https://docs.harness.io/article/pmmfqqo1uh-create-kubernetes-crd-deployments.

"Extending Kubernetes APIs with Custom Resource Definitions (CRDs)," 2021, https://www.velotio.com/engineering-blog/extending-kubernetes-apis-with-custom-resource-definitions-crds.

* cited by examiner

```
apiVersion: moodlecontroller.kubeplus/v1
kind: Moodle
metadata:
  name: my-moodle
  annotations:
    platform-as-code/usage: moodle-operator-usage.usage
    platform-as-code/constants: moodle-operator-implementation-details.implementation_choices
    platform-as-code/openapispec: moodle-openapispec.openapispec
    platform-as-code/composition: Deployment, Service, PersistentVolume, PersistentVolumeClaim, Secret
    migration-flag: Value
spec:
  domain: moodle.college.com
  replicas: 3
```

AUTOMATICALLY INTEGRATING SOFTWARE COMPONENTS INTO A CONTROL FRAMEWORK IN A DISTRIBUTED COMPUTING ENVIRONMENT

TECHNICAL FIELD

The present disclosure relates generally to management of software components. More specifically, but not by way of limitation, this disclosure relates to automatically integrating software components into a control framework in a distributed computing environment.

BACKGROUND

Distributed computing environments such as cloud computing environments and data grids have recently grown in popularity given their ability to reduce costs, improve scalability, and reduce time to deploy new software. Because distributed computing environments can be complex, it has become increasingly common for distributed computing environments to include automation software to automate various repeatable tasks. One example of automation software is a container orchestration platform. A container orchestration platform can automate the deployment, scaling, and management of software components (e.g., applications and microservices) inside containers to significantly reduce the workloads of users.

Kubernetes is one popular container orchestration platform that can be deployed on a distributed computing environment. Distributed computing environments that are running Kubernetes may be referred to as Kubernetes environments. Kubernetes environments can include operators and other controller software for automating various repeatable tasks, such as deployment, scaling, and backup of software components. An operator is a software extension to Kubernetes that can manage an assigned software component, such as a data object or a stateful application. Once deployed, operators can create, configure, and manage instances of their assigned software components on behalf of a user in a declarative way. For example, an operator can monitor the state of an assigned software component and perform one or more reconciliation operations in response to detecting a state change.

Some operators can also react to the presence or the modification of resource objects in a Kubernetes environment by performing various functions. In the context of Kubernetes, a resource object is an application programming interface (API) object that has one or more characteristics specified in a resource definition. Such API objects can be data objects that are stored in a database, which may be internal to the Kubernetes environment. For example, a pods object can be a data object that is stored in a database and that represents a running pod in the Kubernetes environment. While many types of resource objects are available in Kubernetes by default, it may be desirable to add custom resource objects. A custom resource object can be a special type of resource object that is generally unavailable in Kubernetes by default and that has one or more characteristics specified in a custom resource definition. Such custom resource definitions and custom resource objects can be subsequently added to a Kubernetes installation, for example to extend the Kubernetes API.

BRIEF DESCRIPTION OF THE DRAWINGS

FIG. 2 is an example of custom resource object data according to some aspects of the present disclosure.

DETAILED DESCRIPTION

Figure 1:
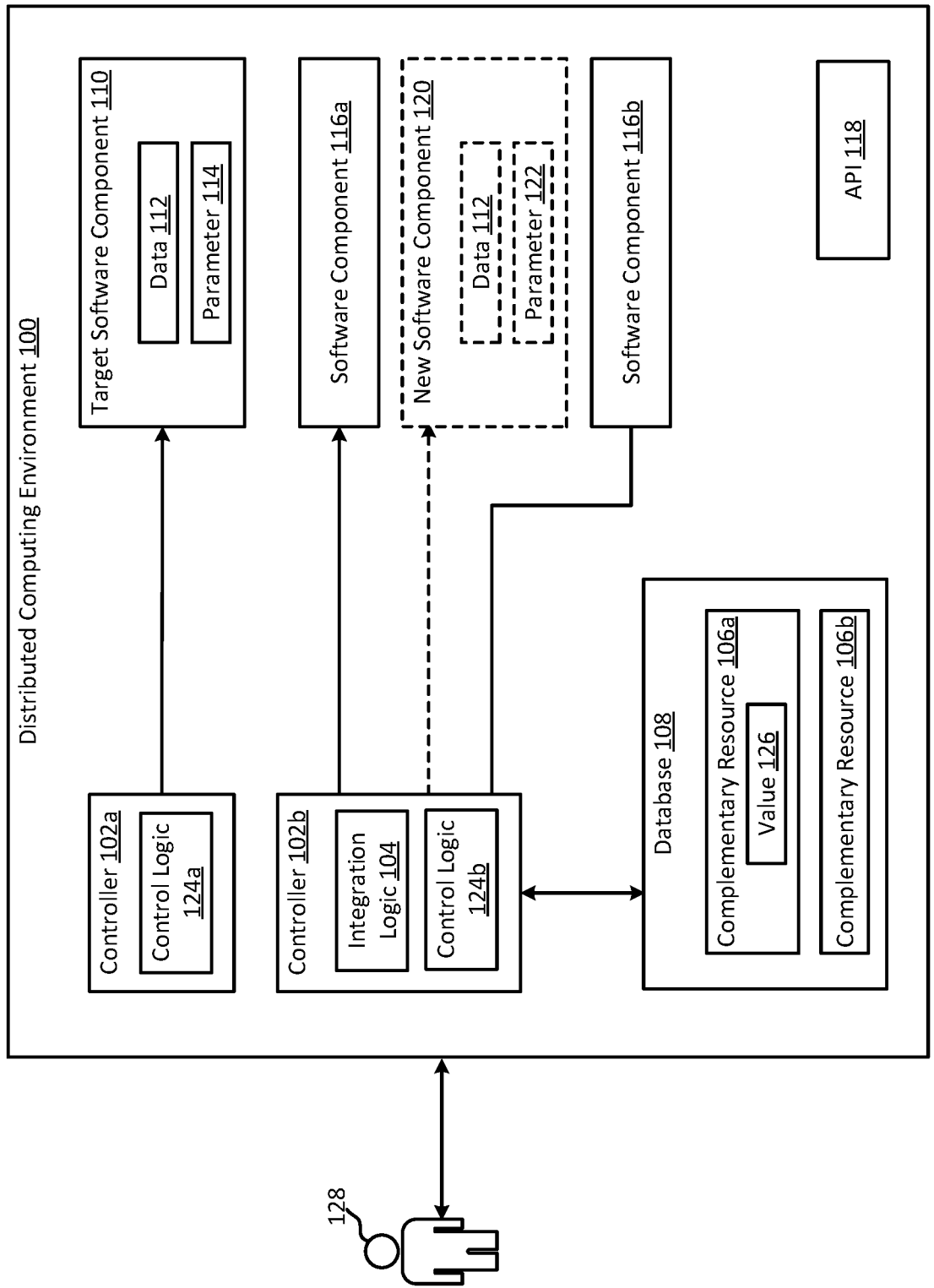
FIG. 1 is a block diagram of an example of a system for automatically integrating software components into a control framework in a distributed computing environment according to some aspects of the present disclosure.

Distributed computing environments often include software controllers such as Kubernetes operators for managing software components. In the past, such controllers were configured to more directly manage the software components. For example, a controller would more directly create and reconcile state changes to software components. But this direct approach can limit flexibility. As a result, a newer control framework was developed. In the newer control framework, a controller manages a software component based on a complementary resource. A complementary resource can be a data object that is separate from but associated with the software component. As one specific example in the context of a Kubernetes environment, the controller can be an operator, the complementary resource can be a custom resource object, and the software component can be a target resource object. The operator can monitor the custom resource object and react to state changes in the custom resource object by manipulating the target resource object accordingly. Using this control framework, the operator can manage the target resource object based on the custom resource object.

Although users may wish to employ the newer control framework described above, it can be challenging to migrate (e.g., integrate) the existing software components in a distributed computing environment to the newer control framework. Such migration can involve manually identifying hundreds or thousands of existing software components to integrate into the new control framework, shutting down the existing software components, and re-deploying them in accordance with the newer control framework. This manual process can be time consuming, tedious, and error prone. As a result, many administrators choose to skip this process entirely. Instead, they simply re-deploy the software components and the corresponding complementary resources in accordance with the newer control framework, leaving the existing software components running in the distributed computing environment. But this duplication of running software components can raise numerous problems. For example, this duplication can increase the complexity of the distributed computing environment, which in turn can raise security issues, increase maintenance overhead, and make the distributed computing environment more prone to failures. This may also result in the unnecessary consumption of computing resources (e.g., memory and processing power) by software components that are no longer being used, which can negatively impact the performance of the distributed computing environment.

Some examples of the present disclosure can overcome one or more of the abovementioned problems by automatically integrating software components of a distributed computing environment into a target control framework, such as the newer control framework described above. For example, a controller can determine whether a flag is set in relation to a particular complementary resource that is monitored by the controller in the distributed computing environment. If the controller determines that the flag is set, the controller can execute an automated integration process for integrating existing software components into the control framework. In this way, the automated integration process can avoid the duplication of software components and the technical problems described above. The automated integration process can also reduce the burdens on administrators associated with manually performing such integrations.

The controller can perform the integration as follows. The controller can first identify an existing software component in the distributed computing environment that is not already associated with the particular complementary resource, but that is designated to be integrated into the control framework. The controller can then adjust a parameter in the distributed computing environment to assign the existing software component to the particular complementary resource. Alternatively, the controller can copy data from the existing software component into a new software component that is associated with the particular complementary resource, and then remove (e.g., shutdown or delete) the existing software component from the distributed computing environment. Either way, the existing software component can be considered to have been migrated into the control framework. This automated integration process can be repeated until all of the designated software components are automatically integrated into the control framework and related to the particular complementary resource. The controller may then unset the flag associated with the particular complementary resource, so that the automated integration process is only performed once in relation to the particular complementary resource. This automated integration process can then be applied with respect to another complementary resource by the controller.

As one specific example, the distributed computing environment can include a Kubernetes environment and the controller can include an operator. The operator can be configured to monitor a group of custom resource objects, which can serve as the complementary resources in this example. The automated integration process can begin with the operator accessing the data in a particular custom resource object to determine whether a flag is set therein. The flag may be set in a metadata section or another section of the custom resource object. If the flag is set, the operator can identify an existing software component that is not already associated with the particular custom resource object, but that is designated to be associated with the particular custom resource object. An example of the existing software component may be an existing resource object in the Kubernetes environment. The operator can then adjust a property (e.g., an ownership property) of the existing software component to designate it as a child of the particular custom resource object in the Kubernetes environment. Alternatively, the operator can copy data from the existing software component into a new software component that is already associated with the particular custom resource object, and then remove the existing software component from the Kubernetes environment. This can allow the new software component to serve as a replacement for the original software component in the distributed computing environment. Either way, the existing software component can be considered to have been integrated into the control framework. The operator can repeat this integration process for some or all of the software components that are designated to be associated with the particular custom resource object. Once the integration process is complete, the operator can unset the flag in the custom resource object. This may prevent the integration process from being repeated again with respect to the particular custom resource object. The operator can iterate this process for each custom resource object in the group of custom resource objects. In this way, the operator can automatically onboard software components to the control framework.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for integrating software components into a control framework in a distributed computing environment 100 according to some aspects of the present disclosure. In this example, the distributed computing environment 100 includes a controller 102a configured to more directly manage (e.g., monitor, create, or reconcile) a target software component 110, irrespective of a complementary resource. For example, the controller 102a can execute control logic 124a periodically or in response to detecting an event associated with the target software component 110. An example of the event may be a state change event. The controller 102a may detect such events by interacting with an API 118 of the distributed computing environment 100 or by receiving event messages via an eventing system. Upon executing the control logic 124a, the controller 102a can perform one or more operations, such as reconciliation operations, with respect the target software component 110. This may be an older control framework that has limited flexibility.

The distributed computing environment 100 also includes a controller 102b that is configured to monitor any number and combination of complementary resources, such as complementary resources 106a-b. The complementary resources are separate from the controller 102b and may be data objects stored in a database 108. The controller 102b may react to the presence of, or modifications to, the complementary resources by executing one or more operations with respect to one or more corresponding software components, such as software components 116a-b. The software components are separate from the complementary resources. This may be a newer control framework that has improved flexibility as compared to the older control framework.

It may be desirable to migrate the target software component 110 from the older control framework to the newer control framework, for example to leverage the improved flexibility associated with the newer control framework. To that end, the controller 102b may include integration logic 104 to automatically effectuate such a migration. Although the integration logic 104 is shown in FIG. 1 as being separate from the control logic 124b of the controller 102b, in other examples the integration logic 104 may be part of the control logic 124b. The controller 102b can execute the integration logic 104 to implement an automated integration process, such as the process described below.

More specifically, the controller 102b can determine whether a flag is set in relation to a particular complementary resource 106a. A user 128 may set the flag to initiate the automated integration process based on the complementary resource 106a. In some examples, the flag may be set in the complementary resource 106a itself by modifying its data stored in the database 108. The controller 102b can access the data of the complementary resource 106a to determine if the flag is set. In alternative examples, the flag may be set in a database (e.g., database 108 or another database) or in another location, which may be internal or external to the distributed computing environment 100. The controller 102b can access the location to determine if the flag is set. If the controller 102b determines that the flag is not set, then the controller 102b may stop executing the integration logic 104 with respect to the particular complementary resource 106a. Otherwise, the controller 102b can continue the automated integration process.

If the controller 102b determines that the flag is set, the controller 102b can next determine which of the existing software components in the distributed computing environment 100 are not already integrated into the newer control framework, and are designated to be associated with the particular complementary resource 106a in the newer control framework. The controller 102b can make this determination based on a value 126, which may be set by the user 128. The value 126 can indicate a characteristic of the designated software components that is usable to identify the designated software components. Examples of the value 126 can include a naming convention used with the designated software components or a type of the designated software components. In this way, the value 126 can be used to distinguish the software components designated to be associated with the complementary resource 106a from other software components that are not designated to be associated with the complementary resource 106a.

The value 126 can be stored in any suitable location that is accessible to the controller 102b. For example, the value 126 may be stored in the data of the complementary resource 106a itself, as shown in FIG. 1. In one such example, the value 126 can be the value of the flag. In another example, the value 126 may be preprogrammed into the controller 102b, for instance as part of the integration logic 104. As still another example, the value 126 may be stored in a database (e.g., database 108 or another database) that is accessible to the controller 102b. The value 126 can provide a hint or otherwise assist the controller 102b in determining which software components to integrate into the newer control framework in relation to the complementary resource 106a.

In the example shown in FIG. 1, the controller 102b has determined that the target software component 110 is to be integrated into the newer control framework, such that the target software component 110 is associated with the complementary resource 106a. So, the controller 102b can proceed to integrate the target software component 110 into the newer control framework by creating a hierarchical relationship between the target software component 110 and the complementary resource 106a, whereby the target software component 110 is a child of, or otherwise associated with, the complementary resource 106a.

In some examples, the controller 102b can generate this hierarchical relationship by adjusting a parameter in the distributed computing environment 100. For example, the controller 102b can adjust a parameter 114 of the target software component 110 to create the hierarchical relationship. The parameter 114 may be, for example, an ownership parameter associated with the target software component 110. The controller 102b can modify the ownership parameter to include an identifier of the complementary resource 106a. This can create a hierarchical relationship can between the target software component 110 and the complementary resource 106a, whereby the target software component 110 is "owned" and therefore associated with the complementary resource 106a in the control framework. In other examples, the controller 102b can adjust a parameter in a database that stores relationships between complementary resources and software components, to create the hierarchical relationship.

Alternatively, the controller 102b can integrate the target software component 110 into the newer control framework by copying data 112 from the target software component 110 into a new software component 120 that is associated with the complementary resource 106a. A new software component can simply be a software component that is different from the target software component 110. The controller 102b can then remove the target software component 110 from the distributed computing environment 100. In this way, the new software component 120 may serve as a replacement for the target software component 110, whereby the new software component 120 is managed via the newer control framework. Typically, the new software component 120 is deployed by the controller 102b after the target software component 110 is deployed, and for the specific purpose of replacing the target software component 110, but other implementations are possible.

Once the controller 102b has integrated the target software component 110 into the newer control framework (e.g., using either of the above techniques), the controller 102b may remove the controller 102a from the distributed computing environment. For example, the controller 102b can transmit a command to the API 118 for causing the controller 102a to be removed. Removing the controller 102a may prevent computing resources from being unnecessarily consumed by a controller 102a that is no longer required.

The controller 102b can repeat the above integration process for some or all of the designated software components that are to be associated with the complementary resource 106a. Once the integration process is complete, the controller 102b can unset the flag associated with the complementary resource 106a. For example, the controller 102b can set the value of the flag to zero. This may prevent the controller 102b from performing the integration process multiple times with respect to the same complementary resource 106a.

Having completed the automated integration process with respect to the complementary resource 106a, the controller 102b may next move on to complementary resource 106b. That is, the controller 102b can execute the integration process with respect to complementary resource 106b (e.g., by determining if a corresponding flag is set, etc.). The controller 102b can execute the integration process with respect to another number and combination of complementary resources.

Although FIG. 1 depicts a certain number and arrangement of components, this is intended to be illustrative and non-limiting. Other examples may include more components, fewer components, different components, or a different arrangement of the components than is shown in FIG. 1. For instance, the controllers 102a-b, complementary resources 106a-b, software components 116a-b, target software component 110, or any combination thereof may be located externally to the distributed computing environment 100. Additionally, the target software component 110 may not have a corresponding controller 102a prior to the automated integration process, in some examples.

FIG. 2 is an example of data 208 for a custom resource object according to some aspects of the present disclosure. In this example, the data 208 includes a specification section 202, a metadata section 204, and may include additional or alternative sections.

The specification section 202 can define characteristics associated with the custom resource object. For example, the specification section 202 can define the domain and number of replicas for the custom resource object. The specification section 202 can be drafted by a user. In general, the specification section 202 cannot be modified by a controller (e.g., operator) of the Kubernetes environment because controllers lack such permissions.

The metadata section 204 can include additional information. For example, the metadata section 204 can include annotations, which may be used to enable discovery and binding functions. The metadata section 204 can also be drafted by a user. But, the metadata section 204 can be subsequently modified by a controller of the Kubernetes environment.

The metadata section 204 can include a flag that may be set to a value. The flag and value are represented in box 206 as "migration-flag: Value," but the flag can have any suitable name and the value can have any suitable value. As described above, the flag can be set to a value to indicate to the controller that an automated integration process is to be initiated. For example, the value can be set (e.g., by the user) to any non-zero or non-null value for initiating the integration process. By locating the flag 206 in the metadata section 204, the controller can unset the flag 206 upon completion of the integration process, since the metadata section 204 is modifiable by the controller. Conversely, if the flag 206 was located in a section that is not modifiable by the controller (e.g., the specification section 202), the controller would not be able to unset the flag 206 upon completion of the integration process. This could result in the integration process being repeated multiple times in relation to the same custom resource, which may unnecessarily consume computing resources and raise other problems.

Although FIG. 2 depicts certain types and arrangements of information, this is intended to be illustrative and non-limiting. Other examples may include more information, less information, different information, or a different configuration of the information than is shown in FIG. 2. For instance, the flag and/or value may be located in a part of the metadata section 204 that is different from the annotations portion. And although FIG. 2 depicts an example of data 208 for a custom resource object in a Kubernetes environment, in other examples the data 208 may be for another type of complementary resource.

Figure 3:
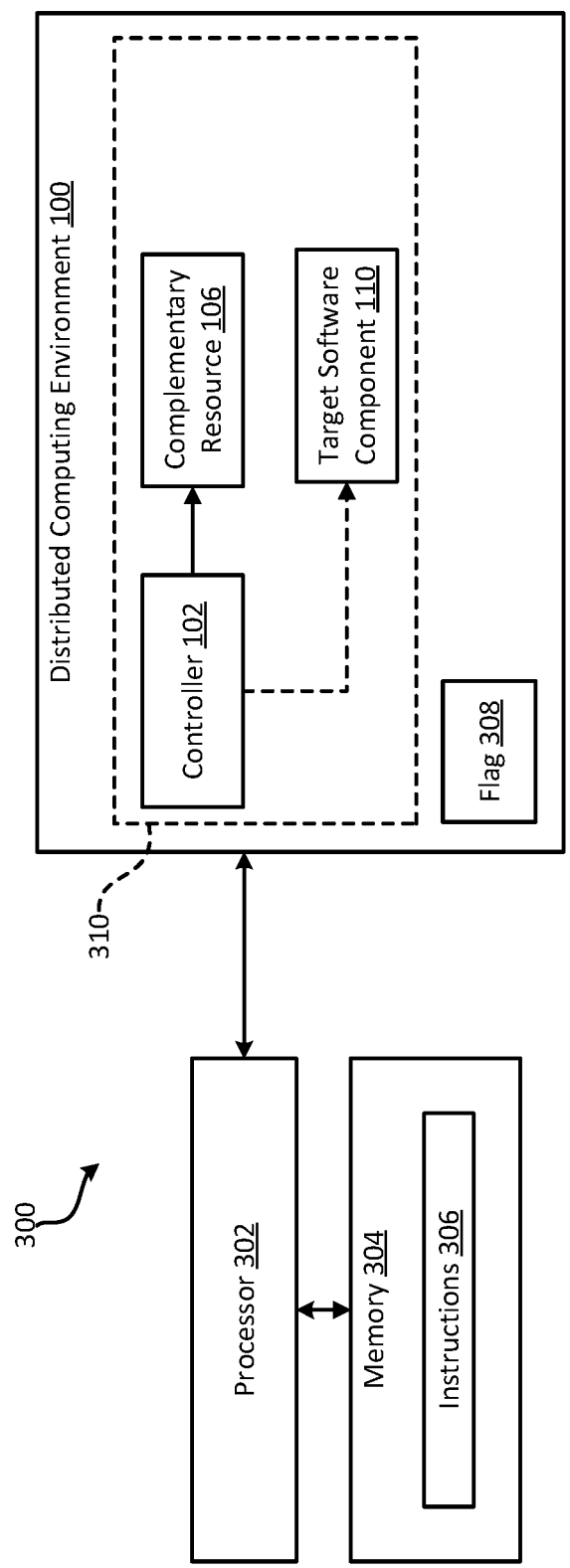
FIG. 3 is a block diagram of another example of a system for automatically integrating software components into a control framework in a distributed computing environment according to some aspects of the present disclosure.

FIG. 3 is a block diagram of another example of a system 300 for integrating software components into a control framework 310 in a distributed computing environment 100 according to some aspects of the present disclosure. The system 300 includes a processor 302 communicatively coupled to a memory 304. In some examples, the processor 302 and the memory 304 can be part of the same computing device. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. The instructions 306 may include processor-specific instructions generated by a compiler or an interpreter from code written in any suitable computer-programming language, such as C, C++, C#, etc. In some examples, the instructions 306 can include the integration logic 104 and/or the control logic 124 of FIG. 1.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

The processor 302 can execute the instructions 306 to perform operations. For example, the processor 302 can determine that a flag 308 is set in relation to a complementary resource 106 that is monitored by a controller 102 in a distributed computing environment 100. The flag 308 may be stored in any suitable location that is internal or external to the distributed computing environment 100, such as in the complementary resource 106. Based on determining that the flag 308 is set, the processor 302 can identify a target software component 110 that is not managed by the controller 102 in the distributed computing environment 100. The processor 302 can then integrate the target software component 110 into the control framework 310 of the distributed computing environment 100. This integration is represented by a dashed arrow in FIG. 3. In the control framework 310, the target software component 110 can be managed by the controller 102 based on the complementary resource 106.

Although FIG. 3 depicts the processor 302 and the memory 304 as being external to the distributed computing environment 100, this is intended to be illustrative and non-limiting. Other examples may involve the processor 302, the memory 304, or both being included in the distributed computing environment 100. For example, the processor 302 and the memory 304 may be part of a node (e.g., a server or other computing device) in the distributed computing environment 100.

Figure 4:
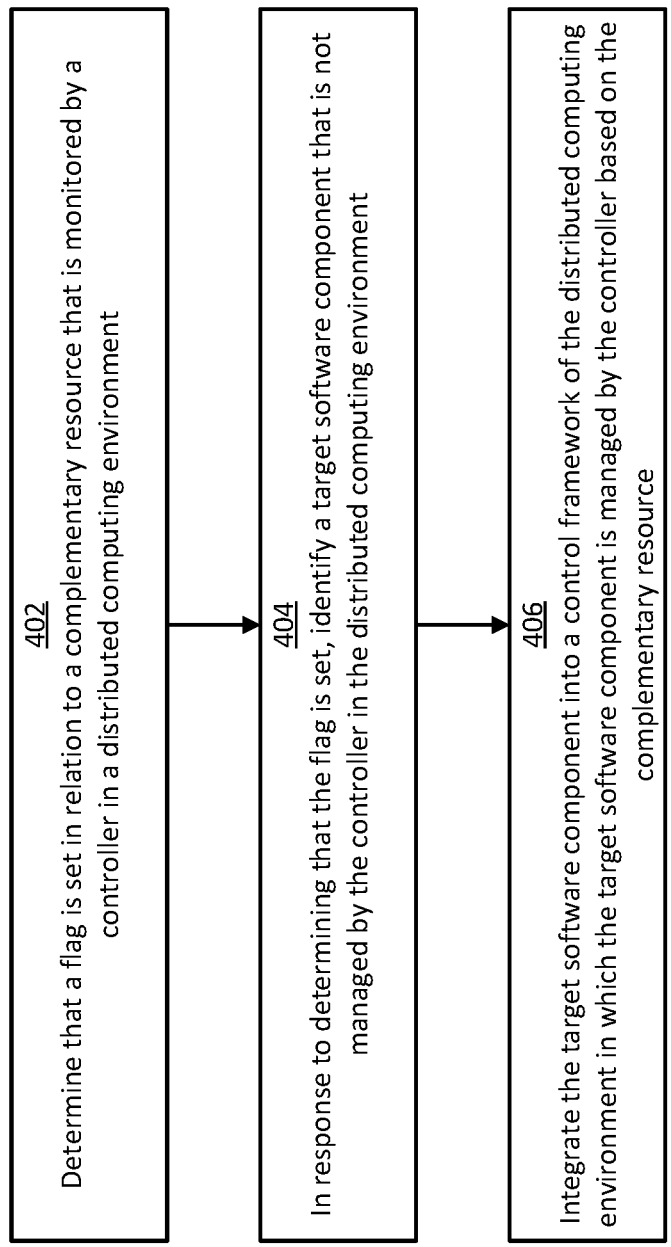
FIG. 4 is a flow chart of an example of a process for automatically integrating software components into a control framework in a distributed computing environment according to some aspects of the present disclosure.

FIG. 4 is a flow chart of an example of a process for integrating software components into a control framework in a distributed computing environment according to some aspects of the present disclosure. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 determines that a flag 308 is set in relation to a complementary resource 106 monitored by a controller 102 in a distributed computing environment 100. In some examples, the flag 308 may be located in the complementary resource 106. So, the processor 302 can access the complementary resource 106 to determine whether the flag 308 is set. Alternatively, the flag 308 may be located in a database or another suitable location. So, the processor 302 can access the database or other location to determine whether the flag 308 is set.

In block 404, the processor 302 identifies a target software component 110 that is not managed by the controller 102 in the distributed computing environment 100, in response to determining that the flag 308 is set. The processor 302 can identify the target software component 110 based on a value indicating which software components are to be managed by the controller 102 based on the complementary resource 106 in the control framework 310. In some examples, the value may be included in the complementary resource 106 itself. In other examples, the value may be stored in a database or another suitable location.

In block 406, the processor 302 integrates the target software component 110 into the control framework 310. In the control framework 310, the target software component 110 is managed by the controller 102 based on the complementary resource 106. For example, the controller 102 can detect and respond to the presence of, the removal of, or state changes in the complementary resource 106 by performing one or more operations with respect to the target software component 110.

In some examples, the processor 302 can integrate the target software component 110 into the control framework 310 by adjusting a parameter in the distributed computing environment 100 to specify a hierarchical relationship between the target software component 110 and the complementary resource 106. The parameter can be, for example, an ownership parameter associated with the target software component 110.

In other examples, the processor 302 can integrate the target software component 110 into the control framework 310 by extracting data from the target software component 110 and deploying a new software component that includes the data. The new software component can be associated with the complementary resource in the control framework 310. The processor 302 may then remove the target software component 110 from the distributed computing environment 100, for example so that the new software component can serve as a replacement for the target software component 110.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
   a processing device; and
   a memory device including instructions for a controller, the instructions being executable by the processing device for causing the processing device to:
      determine that a flag is set in relation to a complementary resource that is monitored by the controller in a distributed computing environment;
      in response to determining that the flag is set, identify a target software component that is executing in the distributed computing environment and that is not already managed by the controller in the distributed computing environment, the complementary resource being separate from the target software component in the distributed computing environment;
      integrate the target software component into a control framework of the distributed computing environment in which the controller is configured to manage the target software component based on the complementary resource at least in part by:
         detecting a state change to the complementary resource; and
         in response detecting the state change to the complementary resource, automatically manipulating the target software component in at least one way.

2. The system of claim 1, wherein the instructions are further executable by the processing device for causing the processing device to:
   unset the flag subsequent to integrating the target software component into the control framework, wherein unsetting the flag involves changing a value of the flag from a first value to a second value, wherein the first value is configured to start an automated integration process for automatically integrating software components associated with the complementary resource into the control framework, and wherein the second value is configured to end the automated integration process.

3. The system of claim 1, wherein the flag is located in the complementary resource, the complementary resource being a data object that is stored in a database of the distributed computing environment.

4. The system of claim 3, wherein the flag is located in a metadata section of the data object.

5. The system of claim 3, wherein the instructions are further executable by the processing device for causing the processing device to identify the target software component based on a value in the data object.

6. The system of claim 5, wherein the flag is set to the value in the data object.

7. The system of claim 1, wherein the controller is an operator in a Kubernetes environment and the complementary resource is a custom resource object in the Kubernetes environment.

8. The system of claim 1, wherein the instructions are further executable by the processing device for causing the processing device to integrate the target software component into the control framework by:
   adjusting a parameter in the distributed computing environment to specify a hierarchical relationship between the target software component and the complementary resource.

9. The system of claim 8, wherein the parameter is a property of the target software component.

10. The system of claim 1, wherein the instructions are further executable by the processing device for causing the processing device to integrate the target software component into the control framework by:
    extracting data from the target software component;
    deploying a new software component that includes the data and that is associated with the complementary resource in the control framework; and
    removing the target software component from the distributed computing environment, wherein the new software component is configured to serve as a replacement for the target software component.

11. A method comprising:
    determining, by a processor, that a flag is set in relation to a complementary resource that is monitored by a controller in a distributed computing environment;
    in response to determining that the flag is set, identifying, by the processor, a target software component that is executing in the distributed computing environment and that is not already managed by the controller in the distributed computing environment, the complementary resource being separate from the target software component in the distributed computing environment;
    integrating, by the processor, the target software component into a control framework of the distributed computing environment in which the controller manages the target software component based on the complementary resource at least in part by:

detecting a state change to the complementary resource; and in response detecting the state change to the complementary resource, automatically manipulating the target software component in at least one way.

12. The method of claim 11, further comprising:
unsetting the flag subsequent to integrating the target software component into the control framework, wherein unsetting the flag involves changing a value of the flag from a first value to a second value, wherein the first value is configured to start an automated integration process for automatically integrating software components associated with the complementary resource into the control framework, and wherein the second value is configured to end the automated integration process.

13. The method of claim 11, wherein the flag is located in a metadata section of the complementary resource, the complementary resource being a data object that is stored in a database of the distributed computing environment.

14. The method of claim 13, further comprising identifying the target software component based on a value in the data object.

15. The method of claim 14, wherein the flag is set to the value in the data object.

16. The method of claim 11, further comprising integrating the target software component into the control framework by:
extracting data from the target software component;
deploying a new software component that includes the data and that is associated with the complementary resource in the control framework; and
removing the target software component from the distributed computing environment, wherein the new software component is configured to serve as a replacement for the target software component.

17. The method of claim 11, wherein the controller is an operator in a Kubernetes environment and the complementary resource is a custom resource object in the Kubernetes environment.

18. The method of claim 14, further comprising integrating the target software component into the control framework by:
adjusting a parameter of the target software component to specify a hierarchical relationship between the target software component and the complementary resource.

19. The method of claim 18, wherein the parameter is an ownership parameter.

20. A non-transitory computer-readable medium comprising program code that is executable by a processor for causing the processor to:
determine that a flag is set in relation to a complementary resource that is monitored by a controller in a distributed computing environment;
in response to determining that the flag is set, identify a target software component that is executing in the distributed computing environment and that is not already managed by the controller in the distributed computing environment, the complementary resource being separate from the target software component in the distributed computing environment;
integrate the target software component into a control framework of the distributed computing environment in which the controller is configured to manage the target software component based on the complementary resource at least in part by:
detecting a state change to the complementary resource; and
in response detecting the state change to the complementary resource, automatically manipulating the target software component in at least one way.

* * * * *